(12) United States Patent
Kismarton

(10) Patent No.: US 8,985,516 B2
(45) Date of Patent: Mar. 24, 2015

(54) REDUCING RISK OF DISBONDING IN AREAS OF DIFFERING STRAIN

(75) Inventor: Max Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 548 days.

(21) Appl. No.: 13/291,667

(22) Filed: Nov. 8, 2011

(65) Prior Publication Data

US 2013/0112812 A1 May 9, 2013

(51) Int. Cl.
| | |
|---|---|
| *B64C 1/12* | (2006.01) |
| *B64C 3/26* | (2006.01) |
| *B64C 1/06* | (2006.01) |
| *B32B 25/00* | (2006.01) |
| *B29C 65/00* | (2006.01) |
| *B32B 3/02* | (2006.01) |
| *B23B 3/08* | (2006.01) |
| *B64C 3/18* | (2006.01) |
| *B64C 3/20* | (2006.01) |

(52) U.S. Cl.
CPC .............. *B64C 1/064* (2013.01); *B32B 25/00* (2013.01); *B29C 65/00* (2013.01); *B32B 3/02* (2013.01); *B23B 3/08* (2013.01); *B64C 1/065* (2013.01); *B64C 3/18* (2013.01); *B64C 3/20* (2013.01); *B64C 3/26* (2013.01)
USPC ........................................................ 244/132

(58) Field of Classification Search
CPC ............ B64C 1/12; B64C 3/26; B64C 1/064; B64C 1/06; B64C 1/069
USPC ............................... 244/131, 132, 119, 123.1
See application file for complete search history.

(56) References Cited

U.S. PATENT DOCUMENTS

| | | | | |
|---|---|---|---|---|
| 2,304,718 | A * | 12/1942 | Swart | 244/132 |
| 4,113,910 | A | 9/1978 | Loyd | |
| 4,574,986 | A * | 3/1986 | Baris et al. | 222/94 |
| 5,240,759 | A * | 8/1993 | Layton | 244/135 A |
| 6,386,481 | B1 * | 5/2002 | Kallinen | 244/123.1 |
| 7,997,534 | B2 * | 8/2011 | Eberth | 244/131 |
| 2006/0243860 | A1 | 11/2006 | Kismarton | |
| 2007/0175966 | A1 | 8/2007 | Barnes | |
| 2008/0210824 | A1 * | 9/2008 | Eberth | 244/131 |
| 2008/0245929 | A1 * | 10/2008 | Patel et al. | 244/131 |
| 2011/0155852 | A1 | 6/2011 | Noebel | |

FOREIGN PATENT DOCUMENTS

DE 10 2006 048641 4/2008

OTHER PUBLICATIONS

International Search Report dated May 16, 2013 in International Application No. PCT/US/2012/052726.

* cited by examiner

*Primary Examiner* — Rob Swiatek
*Assistant Examiner* — Marc Burgess
(74) *Attorney, Agent, or Firm* — Hope Baldauff, LLC

(57) ABSTRACT

Technologies for reducing the risk of disbonding between two bonded members at areas of differing strain in the members are provided. Where the difference in strain between the two bonded members becomes excessing, movement of the members relative to each other may cause a traditional rigid adhesive to fail, resulting in a disbond or delamination in one or both composite members at the point of differing strain. Disbonding may be minimized or prevented by placing a compliant material, such as a thin sheet of rubber, between the structural members at the point of differing strain. The compliance of the material may allow the compliant material to deform enough to remain bonded to both structural members when subjected to a stress that might otherwise disbond or delaminate the bonded members.

18 Claims, 4 Drawing Sheets

REDUCING RISK OF DISBONDING IN AREAS OF DIFFERING STRAIN

BACKGROUND

Two semi-rigid parts that are bonded together may have a risk of disbonding if the two parts each experience different levels of strain at a same point along the bond between the parts. For example, a skin of a wing structure of an aircraft may have a number of structural members, or "stringers," joined to one surface in order to provide shape, strength, and rigidity to the skin. The strains experienced by the skin and the stringer may be the same at most points along the wing structure. However, at a point where the stringer terminates, the skin and the stringer may experience differing levels of strain when the wing structure is loaded, such as during flight. If the stringer is joined to the skin in a traditional method, such using rivets or bolts, the differing strains in the stringer and skin may be tolerated by the joint, since the members are allowed to "fret" or move relative to each other without the joint failing.

If the stringer is bonded to the skin using a rigid material, however, such as an adhesive that is hard or brittle when it cures, then the difference in strains between these two members may cause the adhesive to fail and the stringer to disbond from the skin. Alternatively, the adhesive may hold, but the differing strains may cause a delamination of the layers of a composite skin and/or stringer. Such a disbond or delamination may cause fuel leakage from the wing tanks, excessive aircraft noise during flight, weakening of the wing structure, and the like. Different solutions have been implemented to reduce the risk of disbonding between the stringer and the skin, such as softening the stringer, adding additional bolts or fasteners to the joint, tapering or feathering the stringer at the point of differing strains, and the like. However, none of these solutions sufficiently reduces the risk of disbond between the members when the wing structure is under load.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, structures, and systems are described herein for reducing the risk of disbonding between two bonded structural members at areas of differing strains in the members. Where the difference in strains between the two bonded members becomes excessive, movement of the members relative to each other may cause a traditional rigid adhesive to fail, resulting in a disbond and/or a delamination in the layers of composite members at the point of differing strain. Disbonding may be minimized or prevented by placing a compliant material, such as a thin sheet of rubber, between the structural members at the point of differing strain. The compliance of the material may allow the compliant material to deform enough to remain bonded to both structural members when subjected to a stress that might otherwise disbond or delaminate the bonded members.

According to one aspect, a structure comprises two structural members bonded together with a piece of compliant material disposed between the two structural members at an area of the bond between the members where a differential in strain may occur between the two structural members when the structure is under a load. In another aspect, a method for reducing the risk of disbond between two bonded structural members comprises identifying an area of the bond between the structural members where a differential in strain may occur between the members when placed under a load and disposing a piece of compliant material between the two structural members at the identified area of the bond. In a further aspect, a system for reducing the risk of disbond between a skin of a wing structure in an aircraft and a stringer bonded to the skin includes a piece of compliant material disposed between the skin and the stringer at an area of the bond between them where a differential in strain occurs when the wing structure is under load.

The features, functions, and advantages discussed herein can be achieved independently in various embodiments of the present disclosure or may be combined in yet other embodiments, further details of which can be seen with reference to the following description and drawings.

DETAILED DESCRIPTION

The following detailed description is directed to technologies for reducing the risk of disbonding between two bonded members at areas of differing strain in the members. As utilized herein, "disbonding" refers to the breaking of the adhesive or bond between two-co-bonded members, also known as "mode 1, mode 2, or mode 3 cracking," as well as delamination of the layers of one or both of the composite members. Further, while the embodiments of the disclosure are described herein in the context of a stringer bonded to a skin of a wing or other structure in an aircraft, it will be appreciated that embodiments of the disclosure are not limited to such applications, and that the techniques described herein may also be utilized to prevent disbonding between bonded structural members in other applications. For example, embodiments may be applicable to bonds between structural members in the root of a composite helicopter blade, the centerline joint of a horizontal tail, engine mounts, landing gear assemblies, and the like. The embodiments described herein may also be applicable in any other aircraft and non-aircraft applications comprising joints between parts where there is a disparity between the strains on the separate parts of the joint.

In the following detailed description, references are made to the accompanying drawings that form a part hereof, and that show, by way of illustration, specific embodiments or examples. The drawings herein are not drawn to scale and the relative proportions of the various elements may be exaggerated to illustrate aspects of the disclosure. Like numerals represent like elements throughout the several figures.

Figure 1:
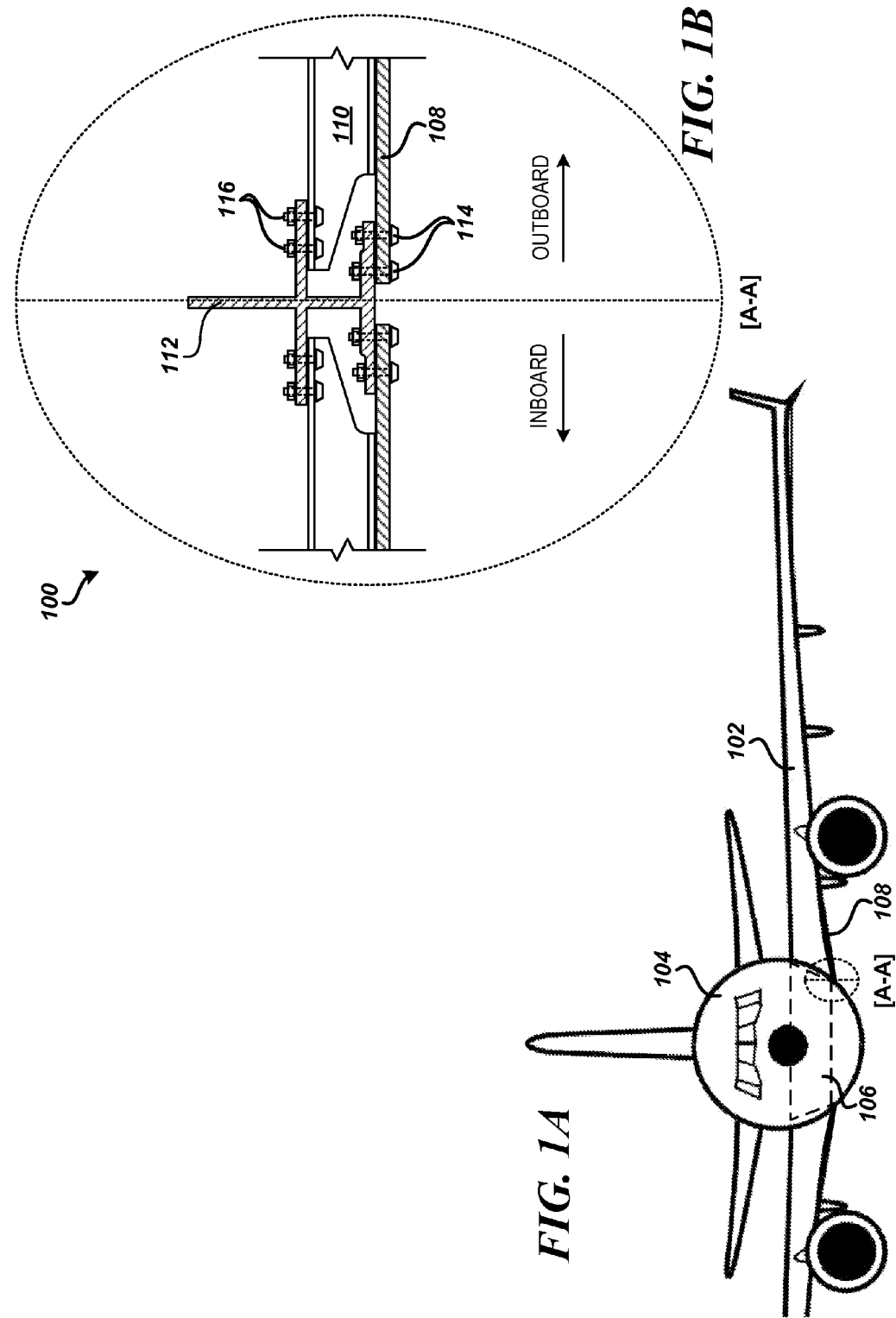
FIG. 1A is a front view of an aircraft having a front cross section area designated.
FIG. 1B is a cutaway diagram of a side-of-body joint of a wing structure according to of FIG. 1A, according to embodiments presented herein.

FIG. 1A and FIG. 1B show an example configuration between two structural members where a risk of disbonding between two members may occur. Specifically, FIG. 1A and FIG. 1B show a cutaway view of a side-of-body joint 100 of a wing structure 102 to another structure in the fuselage 104 of an aircraft, such as a center wing box 106, as shown in the figure. The wing structure 102 comprises a skin 108. The skin 108 of the wing structure 102 may be made of a semi-rigid material, such as carbon-reinforced plastic or other composite or metal material. As is known in the art, one or more stringers 110 may be bonded to one surface of the skin 108 in order to provide shape, strength, and rigidity to the skin in the wing structure 102. The stringers 110 may be made of the same composite or metal material as the skin 108, or of a material with similar rigidity.

At the side-of-body joint 100, the skin 108 and the stringer 110 may be joined to one or more structural elements 112, such as a titanium cord that runs the length of the joint. The skin 108 may be joined by one set of fasteners 114, such as bolts, rivets, or screws, to one portion of the titanium cord, while the stringer may be joined by another set of fasteners 116 to a different portion of the titanium cord. The titanium cord may be further joined to the center wing box 106 or other structure in the fuselage 104 in a similar fashion. It will be appreciated that other configurations of the side-of-body joint 100 may be conceived in which a risk of disbonding between the members may occur beyond that shown in FIG. 1A and FIG. 1B.

Figure 2:
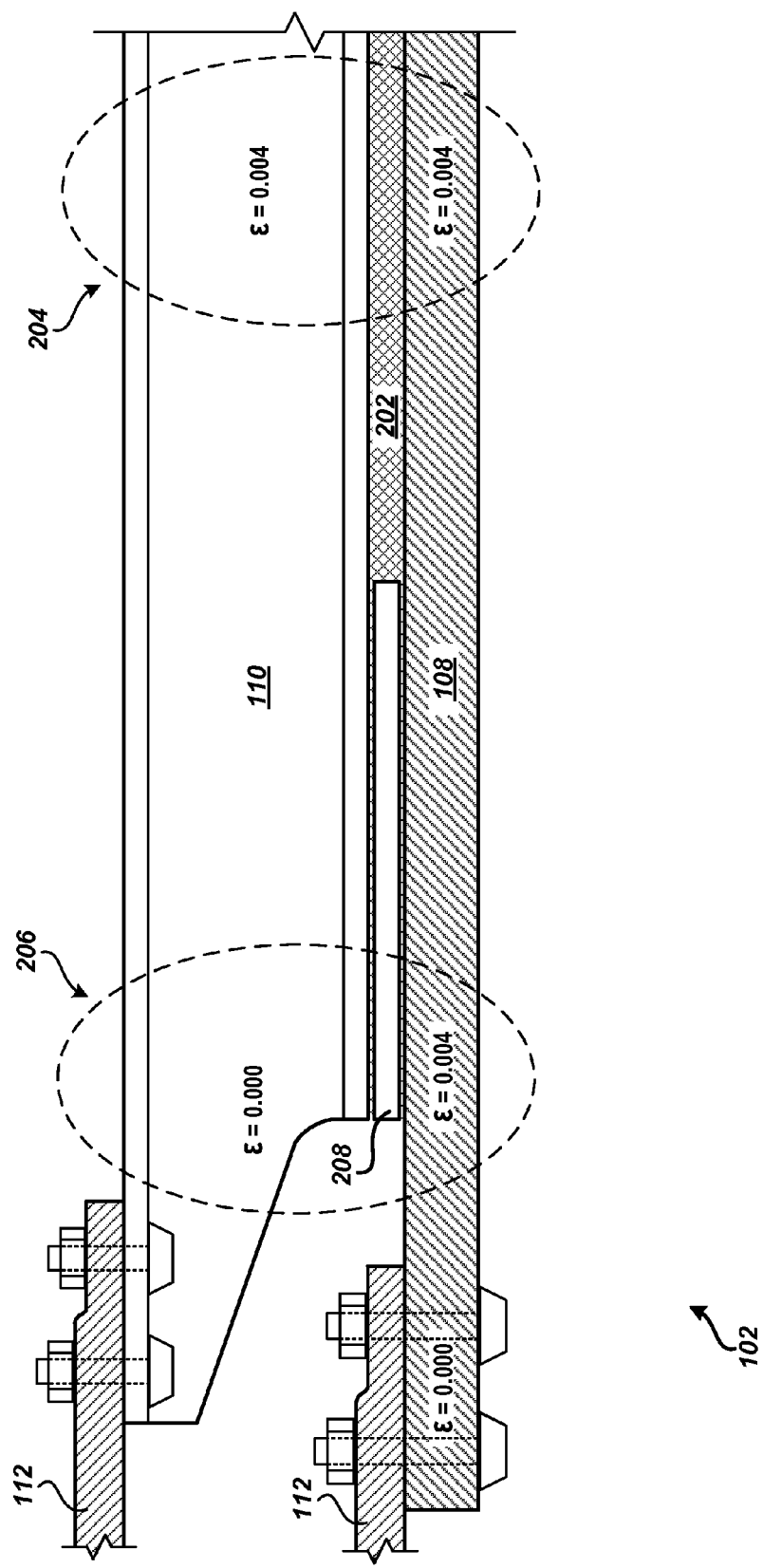
FIG. 2 is a side view of a stringer attached to the skin of the wing structure, according to embodiments presented herein.

FIG. 2 show further details of the wing structure 102. According to embodiments, the stringer 110 is bonded to the skin 108 with an adhesive 202 which forms a strong but relatively rigid bond between the skin and stringer when cured. The point between the stringer 110 and the skin 108 where the adhesive 202 resides is also referred to herein as the "glueline." Because the skin 108 and stringer 110 are made of a same material or materials with similar rigidity, the strains experienced in both the stringer and the skin while the wing structure is loaded may be substantially the same along the majority of the wing structure 102, as shown at 204 in FIG. 2, where the strain E in the stringer 110 and the skin 108 are both shown as 0.004 in./in. This may represent the strain in these structural members when the wing structure 102 is under full load, such as when the aircraft comprising the wing structure is in flight or is being subjected to a maximum design stress in testing, for example.

However, at a point at or near the end of the glueline between the stringer 110 and skin 108, a condition may be created where the strains experienced in one structural member is different from that in the other structural member at the same point. This condition may occur at the side-of-body joint 100 where the stringer 110 and skin 108 are attached to the structural elements 112, or the condition may occur at the stringer "runout" towards the other end of the wing structure 102. For example, as shown at 206, the strain ε in the stringer 110 at the point where the glueline stops may go to zero while the strain in the skin 108 at that points remains at 0.004 in./in. This may create a relatively large in-plane displacement between the stringer 110 and the skin 108 at or near the point of differing strain levels, causing the rigid adhesive 202 to rupture or fail and resulting in a disbond between the stringer 110 and the skin 108 at that point. The differing strains may also cause a delamination to occur between the plies within a composite skin 108 or stringer 110.

According to embodiments, the risk of disbonding between the structural members, e.g. the stringer 110 and the skin 108, may be reduced or eliminated by placing a compliant interface component 208 between the stringer and the skin at the point of differing strains, as further shown in FIG. 2. The compliant interface component 208 may be bonded to both the stringer 110 and the skin 108 using the adhesive 202, and the compliance of the material may allow it deform enough to remain bonded to both structural members through the relatively large displacement caused by the disparity between the respective strain levels. In addition, the compliance of the material in the compliant interface component 208 may prevent a delamination in a composite skin 108 or stringer 110 from occurring.

The optimal thickness of the compliant interface component 208 and the material used in its fabrication may be based on the type of adhesive 202 used at the glueline between the stringer 110 and the skin 108, the expected difference between strain levels in the respective structural members, the environmental conditions in which the bond exists, the total area of the joint, the required load transfer driven by the design of the joint, the form factor of the chosen material, and the like. According to embodiments, the compliant interface component 208 may comprise a thin piece of rubber between 0.003 and 0.100 inches thick. In one embodiment, the compliant interface component 208 may be between 0.020 to 0.050 inches thick. This may provide sufficient compliance in the compliant interface component 208 to remain bonded to both the stringer 110 and the skin 108 under the maximum strain differential, such as 0.004 in./in, without being too thick to be inserted into the glueline. In another embodiment, the piece of rubber is further reinforced with fiberglass cloth to prevent expansion of the compliant interface component 208 during the bonding process. This may allow for more rubber to be used in the compliant interface component 208 without the rubber being squeezed out of the joint under clamp-up loads.

The type of rubber utilized for the compliant interface component 208 between the stringer 110 and the skin 108 may be fuel resistant to survive the fuel tank environment within the wing structure 102, as well as heat resistant to survive the cure cycle during fabrication. The rubber may also need to retain its compliance properties at low temperatures, which may be as low as −20° to −65° F. in the wing structure when the aircraft is operating in external temperatures of down to −65° F. According to one embodiment, a fiberglass-reinforced nitrile rubber film approximately 0.030 thick is utilized for the compliant interface component 208. In other embodiments, the compliant interface component 208 may be made of a fluoroelastomer, such as DUPONT™ VITON® from E. I. du Pont de Nemours and Company of Wilmington, Del. The compliant interface component 208 may also consist of a plastic material, such as nylon, a rubberized adhesive, a plasticized adhesive, and the like.

The compliant interface component 208 may occupy the full width of the bond between the stringer 110 and the skin 108. In addition, the compliant interface component 208 may run the full length of the bond between the stringer 110 and the skin 108 where the potential difference between the strains of the respective structural members is high enough to cause possible failure of the adhesive 202. For example, for a stringer 110 comprising an I-beam of approximately 6" by 6" in dimension bonded to a composite skin 108 of ½" to ¾" in thickness, the compliant interface component 208 may run 6" to 12" along the glueline from the end of the stringer, or the compliant interface component 208 may run the entire length of the stringer.

In one embodiment, the compliant interface component 208 is added between the stringer 110 and the skin 108 when the stringers are co-bonded to the skin 108 during fabrication of the wing structure 102. The compliant interface component 208 may be bonded to the stringer 110 first, and then to the skin 108, or it may be bonded to both at the same time during curing of the adhesive 202. In another embodiment, the compliant interface component 208 may represent a change in the formulation of the adhesive 202 used at the glueline between the stringer 110 and the skin 108 at the point where the differing strains occur. The compliant interface component 208 may further be brushed onto the skin 108 and/or stringer 110 during assembly of the wing structure 102, or may be molded into the stringer 110.

Figure 3:
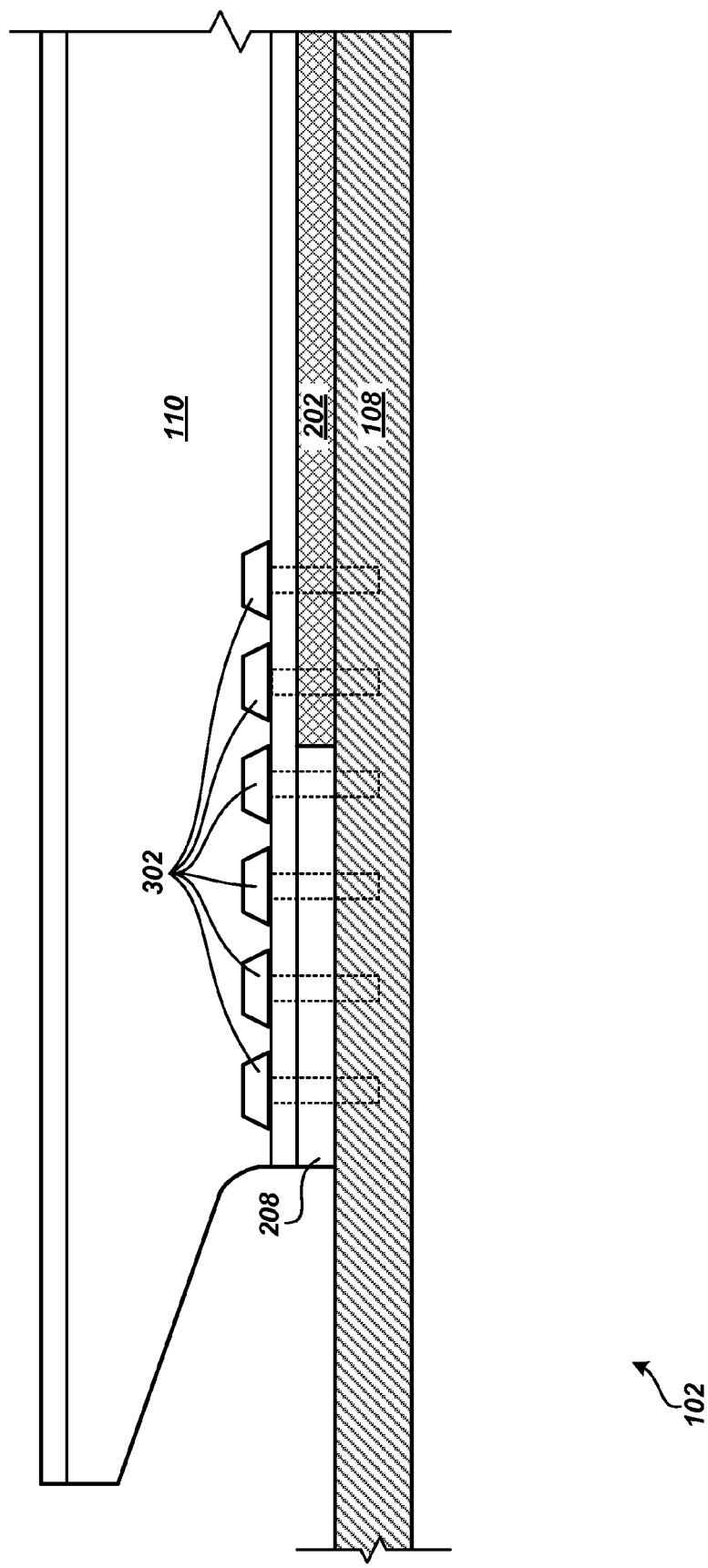
FIG. 3 is another side view of a stringer attached to the skin of a wing structure, according to further embodiments presented herein.

FIG. 3 illustrates another example of the stringer 110 bonded to the skin 108 of the wing structure 102, according to further embodiments. For example, FIG. 3 may illustrate the stringer runout towards the tip of the wing structure 102. In addition to the adhesive 202, a number of fasteners 302, such as bolts, screws, rivets, and the like, may be used to join the stringer 110 to the skin 108 near the end of the stringer, as well at various points along the glueline between the stringer 110 and the skin 108 of the wing structure 102. In one embodiment, the compliant interface component 208 may replace the adhesive 202 in the area of differing strains between the stringer 110 and the skin 108 near the end of the stringer, being "bonded" to the skin and/or stringer through the natural adhesiveness of the material used in the compliant interface component. In additional embodiments, the compliant interface component 208 may be bonded to either the stringer 110 or the skin 108, and the joint between the stringer and the skin may or may not include one or more fasteners 302.

Figure 4:
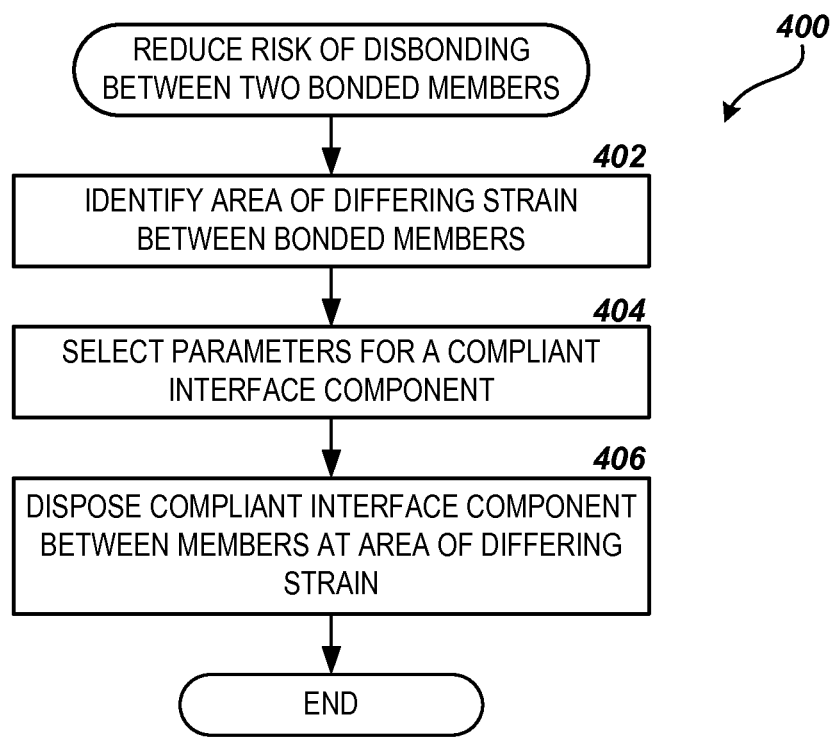
FIG. 4 is a flow diagram illustrating one method for reducing the risk of disbonding between two bonded members at areas of differing strain, according to the embodiments described herein.

FIG. 4 shows a routine 400 for reducing the risk of disbonding between two bonded structural members, according to one embodiment. The routine 400 may be utilized to reduce the risk of disbonding between the stringer 110 and the composite skin 108 at the end of the stringer in the wing structure 102, as described above in regard to FIGS. 2 and 3, for example. The routine 400 begins at operation 402, where an area of differing strain between the bonded structural members while under load is identified. The area may be identified for points along the bonding between the structural members where the difference in levels of strain in the respective members may cause a failure of the adhesive 202 used to bond the members together. For example, a substantial difference between the strain in the stringer 110 and the skin 108 of the wing structure 102 may exist at or near the end of the stringer, such as at the side-of-body joint 100 or the stringer runout, for example.

From operation 402, the routine 400 proceeds to operation 404, where parameters of a compliant interface component are selected, such as the size, type, and thickness of the material to be used in its fabrication. As described above, the thickness of the compliant interface component 208 and the material used in its fabrication may be based on the type of adhesive 202 used at the glueline between the stringer 110 and the skin 108, the expected difference between strain levels in the respective structural members, the environmental conditions in which the bond exists, the total area of the joint, the required load transfer driven by the design of the joint, the form factor of the chosen material, and the like. The compliant interface component 208 may further be reinforced with fiberglass cloth or other material to prevent expansion of the compliant interface component 208 during the bonding process.

The routine 400 proceeds from operation 404 to operation 406, where the compliant interface component 208 is disposed between the structural members in the area of differing strain identified in operation 402. For example, a 0.030 inch thick piece of fiberglass-reinforced nitrile rubber film may be inserted at the glueline between the stringer 110 and the skin 108 near the end of the stringer, as shown in FIGS. 2 and 3. The rubber film may be added between the stringer 110 and the skin 108 at the moment the stringers are co-bonded to the skin during fabrication of the wing structure 102. The compliant interface component 208 may be bonded to one or both of the structural members, using adhesive or some other bonding method, and may occupy the full width of the joint between the members and run the full length of the area of differing strain identified in operation 402. From operation 406, the routine 400 ends.

Based on the foregoing, it should be appreciated that technologies for reducing the risk of disbonding between two bonded members at areas of differing strain in the members are provided herein. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A structure of an aircraft comprising:
   a first structural member having a first major longitudinal axis including an inboard end on the longitudinal axis, and a distal outboard end on the longitudinal axis;
   a second structural member having a second major longitudinal axis parallel to the first major longitudinal axis, the second structural member bonded to the first structural member using an adhesive along a bondline having a third major longitudinal axis parallel to the first and second major longitudinal axes and between the first structural member and the second structural member where substantially similar strain may occur between the first structural member and the second structural member when under a load; and
   a flexible interface component disposed between the first structural member and the second structural member and only at an end portion of the bondline along the third major longitudinal axis between the first structural member and the second structural member where a differential in strain may occur between the first structural member and the second structural member when under a load,
   the flexible interface component at the end portion of the bondline being disposed proximate to the inboard end of the first structural member opposite the distal outboard end of the first structural member.

2. The structure of claim 1, wherein the flexible interface component is bonded to both the first structural member and the second structural member using the adhesive.

3. The structure of claim 1, wherein the flexible interface component comprises a reinforcing material.

4. The structure of claim 1, wherein the flexible interface component comprises a thin piece of rubber.

5. The structure of claim 1, wherein the flexible interface component comprises a thin piece of fiberglass-reinforced nitrile rubber film.

6. The structure of claim 1, wherein the first structural member comprises a skin of the structure, and wherein the second structural member comprises a stringer bonded to the skin of the structure.

7. The structure of claim 6, wherein the area of the bond where the difference in strain exists comprises an end of the stringer.

8. A method for reducing a risk of disbond between two bonded structural members in a wing structure of an aircraft, the method comprising:

identifying an end portion of a bondline between a first structural member and a second structural member in a major longitudinal direction where a differential in strain may occur between the first structural member and the second structural member when under a load, the end portion of the bondline in the major longitudinal direction being disposed proximate to an inboard portion of the first structural member attached to the aircraft and opposite an outboard distal end portion of the first structural member;

disposing a flexible interface component between the first structural member and the second structural member only at the end portion of the bondline in the major longitudinal direction; and applying an adhesive along the bondline and proximate to the end portion of the bondline.

9. The method of claim 8, wherein the flexible interface component is disposed between the first structural member and the second structural member during co-bonding of the first structural member and the second structural member.

10. The method of claim 8, wherein the flexible interface component is bonded to both the first structural member and the second structural member.

11. The method of claim 8, wherein the flexible interface component comprises a reinforcing material.

12. The method of claim 8, wherein the flexible interface component comprises a thin piece of rubber.

13. The method of claim 8, wherein the flexible interface component comprises a thin piece of fiberglass-reinforced nitrile rubber film.

14. The method of claim 8, wherein the first structural member comprises a skin of the structure, and wherein the second structural member comprises a stringer bonded to the skin of the structure.

15. The method of claim 14, wherein the area of the bond where the difference in strain exists comprises an end of the stringer.

16. A system for reducing a risk of disbond between a skin of a wing structure in an aircraft and a stringer bonded to the skin, the system comprising:

the skin of the wing structure;

the stringer having a major longitudinal axis bonded along a bondline to the skin along a length of the wing structure; and a flexible interface component only disposed between the skin and the stringer at an end portion of the bondline on the major longitudinal axis and between the skin and the stringer where a differential in strain occurs between the skin and the stringer when the wing structure is under a load, the end portion of the bondline on the major longitudinal axis being disposed proximate to an inboard portion of the stringer attached to the aircraft and opposite an outboard distal end portion of the stringer.

17. The system of claim 16, wherein the flexible interface component is disposed between the skin and the stringer only at an end of the stringer nearest a point of attachment of the wing structure to a fuselage of the aircraft.

18. The system of claim 16, wherein the flexible interface component is disposed between the skin and the stringer only at an end of the stringer comprising the stringer runout.

\* \* \* \* \*